(12) United States Patent
Schulz et al.

(10) Patent No.: US 7,802,837 B2
(45) Date of Patent: Sep. 28, 2010

(54) VEHICLE ROOF

(75) Inventors: Lars Schulz, Schöneiche (DE); Felix Hermann, Leonberg (DE); Dominik Beierl, Korntal-Münchingen (DE)

(73) Assignee: Dr. Ing h.c. F. Porsche AG, Stuttgart (DE)

( * ) Notice: Subject to any disclaimer, the term of this patent is extended or adjusted under 35 U.S.C. 154(b) by 300 days.

(21) Appl. No.: 11/852,508

(22) Filed: Sep. 10, 2007

(65) Prior Publication Data

US 2008/0061590 A1 Mar. 13, 2008

(30) Foreign Application Priority Data

Sep. 8, 2006 (DE) ...................... 10 2006 042 203

(51) Int. Cl.
*B60J 7/12* (2006.01)
(52) U.S. Cl. ...................................... 296/124; 296/127
(58) Field of Classification Search ......... 296/124–126, 296/109, 114, 115, 127, 129, 136.01, 136.04, 296/136.05
See application file for complete search history.

(56) References Cited

U.S. PATENT DOCUMENTS

| | | | | | |
|---|---|---|---|---|---|
| 1,043,227 | A | * | 11/1912 | Halladay | 296/129 |
| 1,073,503 | A | * | 9/1913 | Macdonald | 296/129 |
| 1,491,621 | A | * | 4/1924 | Pfander et al. | 296/125 |
| 4,988,121 | A | * | 1/1991 | Yoshii | 280/808 |
| 5,207,474 | A | | 5/1993 | Licher et al. | |
| 5,868,454 | A | | 2/1999 | Homann et al. | |
| 6,305,735 | B1 | | 10/2001 | Neubrand | |
| 6,595,574 | B2 | * | 7/2003 | Shaw et al. | 296/120.1 |
| 6,702,363 | B2 | * | 3/2004 | Tohda et al. | 296/124 |
| 7,140,666 | B2 | * | 11/2006 | Wulf et al. | 296/124 |
| 7,216,921 | B2 | * | 5/2007 | Habacker | 296/133 |
| 7,347,481 | B2 | * | 3/2008 | Schuett et al. | 296/107.07 |
| 7,445,266 | B2 | * | 11/2008 | Liedmeyer et al. | 296/124 |
| 7,517,000 | B2 | * | 4/2009 | Liedmeyer et al. | 296/107.09 |
| 7,588,284 | B2 | * | 9/2009 | Hollenbeck | 296/107.12 |

(Continued)

FOREIGN PATENT DOCUMENTS

DE        9206807 U1    9/1993

(Continued)

OTHER PUBLICATIONS

German Search Report dated Jun. 28, 2010.

*Primary Examiner*—Patricia L Engle
(74) *Attorney, Agent, or Firm*—Laurence A Greenberg; Werner H Stemer; Ralph E Locher

(57) ABSTRACT

A vehicle roof has at least two roof segments which, in the closed position of the roof, support a flexible roof skin at least in some regions and can be shifted via at least two pairs of links in a positively controlled manner from a closed position G of the top into a fixed storage position A of the top and vice-versa. One pair of links is thereby drivable by motor in order to move all of the roof parts. In the storage position A of the top, the driven pair of links can be supported by a first vehicle-body-side stop on each side of the vehicle in order to fix all of the roof parts with defined distances being maintained at least between the at least two pairs of links.

13 Claims, 3 Drawing Sheets

U.S. PATENT DOCUMENTS

2002/0041109 A1 4/2002 Wagner et al.
2006/0267371 A1* 11/2006 Queveau et al. ........ 296/107.18

FOREIGN PATENT DOCUMENTS

| DE | 19533802 C1 | 3/1997 |
| DE | 10050286 A1 | 4/2002 |
| DE | 102004005882 A1 | 10/2005 |
| WO | WO 2005039911 A1 * | 5/2005 |

* cited by examiner

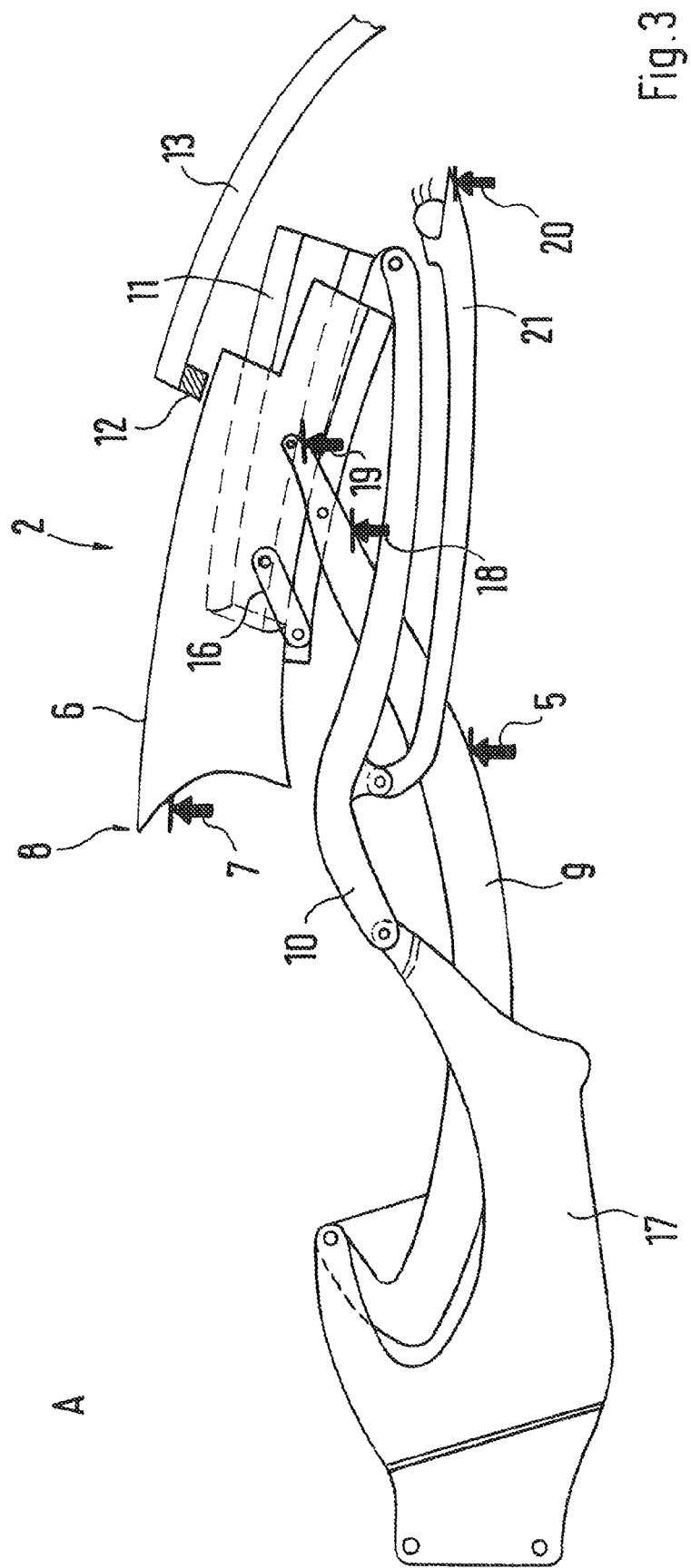

VEHICLE ROOF

CROSS-REFERENCE TO RELATED APPLICATION

This application claims the priority, under 35 U.S.C. §119, of German application DE 10 2006 042 203.1, filed on Sep. 8, 2006; the prior application is herewith incorporated by reference in its entirety.

BACKGROUND OF THE INVENTION

Field of the Invention

The invention relates to a vehicle roof which comprises at least two roof segments which, in the closed position, support a flexible roof skin at least in some regions and can be transferred via at least two pairs of links in a positively controlled manner from a closed position of the top into a fixed storage position of the top and vice-versa. One pair of links is driven by motor in order to carry out a movement of all of the roof parts.

Commonly assigned, German patent DE 195 33 802 C1 and its counterpart U.S. Pat. No. 5,868,454 describes a top for a convertible with the above-described features. There, a put-away top is fixed on the vehicle body, with a closure hook coming into engagement in the region of the roof lug with a counter element. The closure hook serves at the same time also to lock the closed top in the region of a windshield border.

BRIEF SUMMARY OF THE INVENTION

It is accordingly an object of the invention to provide a motor vehicle roof which overcomes the above-mentioned disadvantages of the heretofore-known devices and methods of this general type and which provides for a vehicle roof wherein the top framework is fixed in the put-away position such that the links of the top framework are held in a defined, spaced-apart position, clearances are ensured for the top skin and bows do not come to lie on the top fabric, which bows would be visible as a consequence of abrasions or pressure points on a top fabric.

With the foregoing and other objects in view there is provided, in accordance with the invention, a vehicle roof, comprising:

at least two roof segments and a flexible roof skin supported, in at least some regions thereof, on the at least two roof segments in a closed position of the vehicle roof;

at least two pairs of links connected for shifting said at least two roof segments in a positively controlled manner between a closed position G of the top into a fixed storage position A of the top, said at least two pairs of links including a driven pair of links drivable by motor for moving all roof parts of the vehicle roof;

a first vehicle-body-side stop on each side of the vehicle disposed to support said driven pair of links in the storage position A of the top, for fixing all roof parts of the vehicle roof and maintaining defined spacing distances at least between said at least two pairs of links.

In the storage position of the top, the driven pair of links can be supported by a first vehicle-body-side stop on each side of the vehicle in order to fix all of the roof parts with defined distances being maintained at least between the at least two pairs of links.

The invention therefore obtains a plurality of advantages with just one, in particular adjustable, vehicle-body-side stop (pair of stops). The interaction of the vehicle-body-side stop with just the pair of links, the movement of which positively controls the other pairs of links and elements of the vehicle roof, achieves an overall support of the vehicle roof, which support fixes all of the roof framework parts in a defined putting-away movement.

In particular, there is no concern that the top framework will "collapse" after being transferred into a storage position. Since the two pairs of links are kept at a distance on each side of the vehicle, a motor drive can act on the roof elements with a defined force and defined angles of traction and can bring about a reliable transfer of the put-away roof into a closed position.

In a development of the invention, a second stop is provided which supports the frontmost roof segment or a further roof segment, which is arranged downstream of the front one, in the storage position. In particular, a supporting of the roof lug from below is provided by means of a second stop fixed on the vehicle body, the plurality of stops leading to an even better defined position of the framework parts in the storage position. The second stop can be integrated, for example, into a rollover protection system and, depending on the type and embodiment of the rollover protection system, can be arranged either centrally or in each case in the region behind a pair of seat backs.

In a particularly advantageous development of the invention, a third stop can be provided which acts upon a roof segment situated in the storage position, for example from above and/or from the side, in the form of a buffer. The formation of such a multi-point support of the put-away roof with provision of a vertical adjustment by means of a stop or pair of stops makes it possible to fix the put-away roof in such a manner that a certain internal stress is produced in the roof framework. As a result, rattling is avoided and, after the third stop, which is directed in its direction of action at least counter to the direction of action of the first or of the second stop, is released, a first opening movement is initiated before the actuating force of the motor acts on the roof via the linkage parts. In addition, the adjustability of the stops makes it easily possible to compensate for certain manufacturing tolerances of the top framework or of its mounting.

The third stop can advantageously be arranged on the inside or lower side of a top compartment lid or rear lid. The pairs of links of the roof framework form at least one four-bar linkage which, in the put-away state, lies in a secured position between at least two of the stops. Such a releasable fixing of the four-bar linkage secures all of the movable roof linkage parts in a simple manner.

A further advantage then arises if at least the frontmost roof part is designed as a rigid roof shell and, in the storage position of the top, said roof shell is acted upon in a fixing manner by the second stop and the third stop with a shearing force being exerted on the top framework. Also with securing in this manner, a simple and effective fixing of the entire top linkage in addition to roof segments can be achieved by the action upon the frontmost roof part by means of the stops.

Other features which are considered as characteristic for the invention are set forth in the appended claims.

Although the invention is illustrated and described herein as embodied in vehicle roof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a simplified schematic illustration of the movable vehicle roof of FIG. 2.

DETAILED DESCRIPTION OF THE INVENTION

Figure 1:
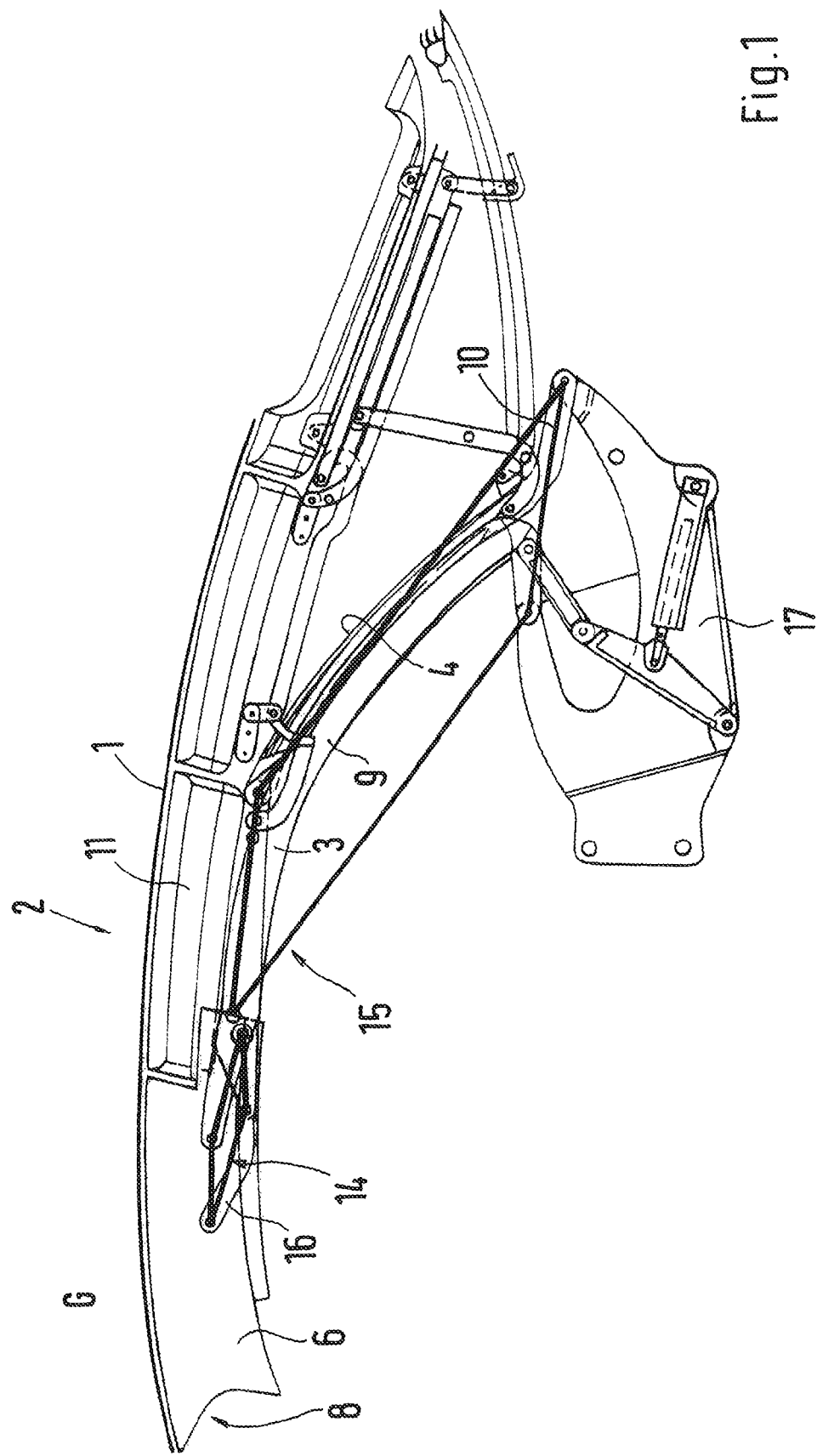
FIG. 1 is a schematic side view of a movable vehicle roof according to the invention in a closed position of the top.
Figure 2:
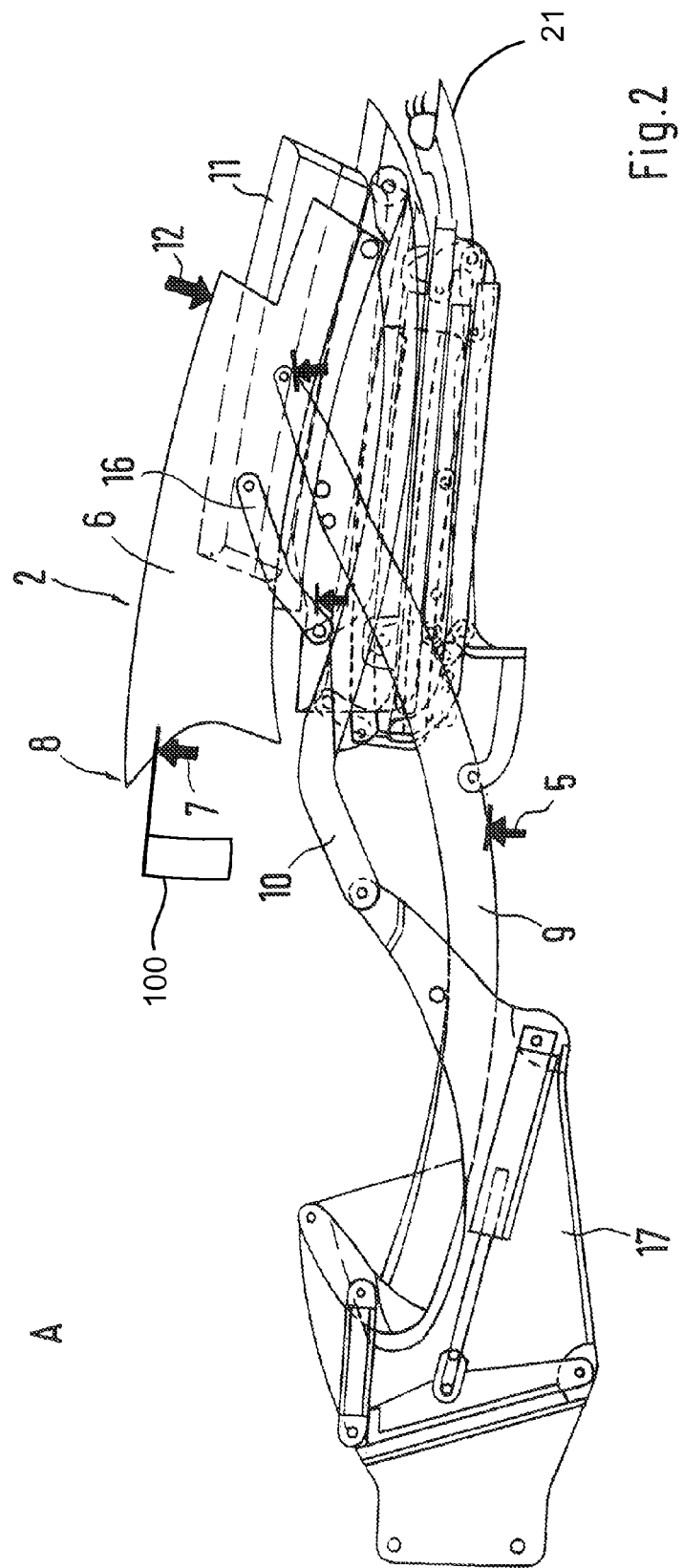
FIG. 2 is a schematic side view of the movable vehicle roof in a storage position of the top.

Referring now to the figures of the drawing in detail and first, particularly, to FIG. 1 thereof, the movable vehicle roof comprises four roof segments 2 which, in the closed position, support a flexible roof skin 1 at least in some regions and can be shifted via two pairs of links 3, 4 in a positively controlled manner from a closed position G of the top into a fixed storage position A of the top and vice-versa, one pair of links 3 being driven by motor in order to move all of the roof parts 1, 2, 3, 4. The two pairs of links 3, 4 are connected in an articulated manner to a main bearing 17. In drawing FIG. 2, the vehicle roof is illustrated in the storage position A of the top, the driven pair of links 3 being supported here by a first vehicle-body-side stop 5 on each side of the vehicle. By means of this measure, all of the roof parts 1, 2, 3, 4 are fixed with defined distances being maintained at least between the two pairs of links 3, 4. The fixing of the roof skin 1 in the storage position A is to be understood as meaning stress-free storage.

For a more detailed explanation, reference is made to FIG. 3 of the drawing, since the latter, for clarity reasons, only reproduces the basic elements of the vehicle roof according to the invention in simplified form. The frontmost roof segment 6 in the closed position G of the top is supported by the second stop 7. The second stop 7 is fixed on the vehicle body and can be integrated, for example, into a rollover protection system 100.

The second stop 7 is preferably arranged in the region behind the pair of seat backs. The frontmost roof segment 6 is engaged under at its front region, the roof lug 8, by the second stop 7.

In the preferred embodiment, the vehicle roof comprises two pairs of links 3, 4 which are designed as a pair of roof links 9 and pair of supporting links 10, the pair of roof links 9 being connected at least to the frontmost roof segment 6 and the pair of supporting links 10 to the roof segment 11 arranged downstream of the frontmost roof segment 6. In this case, the pair of supporting links 10 is driven indirectly via the motor-driven pair of roof links 9. The pair of roof links 9 is connected in an articulated manner to the frontmost roof segment 6 and at the same time to the second roof segment 11, and therefore, for example, during the closing movement of the vehicle roof, a tensile force is transmitted from the pair of roof links 9 via the second roof segment 11 to the pair of supporting links 10 and, as a result, the pair of supporting links 10 is indirectly driven.

Furthermore, a third stop 12 is provided which acts on a roof segment 2, 6, 11 from above in the form of a buffer. In the embodiment illustrated in drawing FIG. 3, the frontmost roof segment 6 is acted upon by the third stop 12. If the roof segment 2 acted upon by the third stop 12 in the storage position A of the top is not entirely covered by a roof skin 1 (not illustrated in FIG. 3), it is expedient to place the third stop 12 in such a manner that the latter acts upon a region of the roof segment 2, at which no flexible roof skin 1 is arranged. For example, the third stop 12 acts upon lateral roof frame side parts which are not covered by the flexible roof skin 1, in order to fix the vehicle roof in the storage position A of the top.

Furthermore, in the embodiment illustrated, the third stop 12 is arranged on the inside of a top compartment lid 13. However, an arrangement of the third stop 12 in the border region of the top compartment lid 13 would likewise also be possible. In the case of a vehicle without a top compartment lid 13, this function could also be realized via a rear lid (not illustrated) which has a buffer at its end pointing forward in the longitudinal direction of the vehicle, and executes a relative movement with respect to the vehicle roof during the putting away of the top.

At least one of the stops 5, 7, 12 is vertically adjustable both in order to compensate for manufacturing tolerances and for the specific securing of the roof segments 2 in the storage position A of the top. Such a vertically adjustable stop can be designed, for example, as a buffer element with a threaded rod which can be fixed on the vehicle body and vertically via a lock nut.

Two four-bar linkages 14, 15 can be seen in drawing FIG. 1. The first four-bar linkage 14 is composed of the levers of the upper region of the roof link 9, a partial region of the frontmost roof segment 6, the coupling link 16, and a partial region of the second roof segment 11, with the two roof segments 6, 11 each being connected in an articulated manner to the roof link 9 and to the coupling link 16. The second four-bar linkage 15 is composed of the levers of a predominant region of the roof link 9, a partial region of the second roof segment 11, the supporting link 10 and a partial region of the main bearing 17. In the storage position A of the top, at least one of the four-bar linkages 14, 15 is brought into a secured position between at least two stops 5, 7, 12.

In the preferred embodiment, the frontmost roof segment 6 is designed as a rigid roof shell and is fixed in the storage position A of the top by the second stop 7 and the third stop 12 with a shearing force being exerted on the top framework. As is apparent from drawing FIG. 3, the frontmost roof segment 6 is supported on the front side by the second stop 7 and at the same time is pressed downward at its rear end from above by the third stop 12. The downwardly directed force emerging from the third stop 12 is caused by the dead weight of the top compartment lid 13. Furthermore, it can be provided that the downwardly directed force of the third stop 12 can be reinforced by a—prestressed—top compartment lid 13 which is held actively in the closed position.

It lies within the scope of the invention to support the action of the first to third stops by means of a fourth stop 18, fifth stop 19 and sixth stop 20, which act on the pair of roof links 9 or pair of supporting links 10, or a clamping hoop 21, as far as stop 20 is concerned. The stops 18, 19 and 20 can also be of vertically adjustable design.

The invention claimed is:

1. A vehicle roof for a vehicle body of a vehicle, comprising:
   at least two roof segments;
   a flexible roof skin supported, in at least some regions thereof, on said at least two roof segments in a closed position of the vehicle roof;
   at least two pairs of links connected for shifting said at least two roof segments in a positively controlled manner between a closed position of the top into a fixed storage position of the top, said at least two pairs of links including a driven pair of links drivable by motor for moving all roof parts of the vehicle roof;
   a first vehicle-body-side stop fixed on each side of the vehicle body and disposed to directly support said driven pair of links in the storage position of the top, for fixing all roof parts of the vehicle roof and maintaining defined spacing distances at least between said at least two pairs of links.

2. The vehicle roof according to claim 1, wherein said at least two roof segments include a frontmost roof segment and a last roof segment, and wherein a second stop supports said frontmost roof segment or a roof segment disposed ahead of said last roof segment and adjoining the first roof segment in the storage position.

3. The vehicle roof according to claim 2, wherein said second stop is fixed on the vehicle body.

4. The vehicle roof according to claim 3, wherein said second stop is integrated in a rollover protection system of the vehicle.

5. The vehicle roof according to claim 2, wherein said second stop is arranged either centrally or in pairs in each case in region behind a pair of seat backs.

6. The vehicle roof according to claim 5, wherein said second stop engages under a roof lug.

7. The vehicle roof according to claim 1, wherein said pairs of links are a pair of roof links and a pair of supporting links, and said pair of supporting links is indirectly driven via said pair of roof links.

8. The vehicle roof according to claim 2, which further comprises a third stop forming of a buffer disposed to act upon a roof segment from above.

9. The vehicle roof according to claim 8, wherein said third stop is disposed to act upon a vehicle roof region that is not provided with said flexible roof skin.

10. The vehicle roof according to claim 8, wherein said third stop is disposed on an inside or an edge side of a top compartment and/or a rear lid.

11. The vehicle roof according to claim 8, wherein at least one of said first stop, said second stop, and said third stop is a vertically adjustable stop.

12. The vehicle roof according to claim 1, wherein said pairs of links form a roof framework including at least one four-bar linkage which, in the fixed storage position, is placed in a secured position between at least two stops.

13. The vehicle roof according to claim 8, wherein said at least two roof segments include a frontmost roof segment and at least said frontmost roof segment is a rigid roof shell and, in the storage position of the top, said roof shell is acted upon in a fixing manner by the second stop and the third stop with a shearing force being exerted on the top framework.

* * * * *